US010740614B2

(12) United States Patent
Bao et al.

(10) Patent No.: US 10,740,614 B2
(45) Date of Patent: Aug. 11, 2020

(54) INFORMATION PROCESSING DEVICE, INFORMATION PROCESSING METHOD, AND PROGRAM STORING MEDIUM

(71) Applicant: NEC Corporation, Minato-ku, Tokyo (JP)

(72) Inventors: Ruihan Bao, Tokyo (JP); Yoshinori Saida, Tokyo (JP); Shin Norieda, Tokyo (JP); Takami Sato, Tokyo (JP); Kota Iwamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/090,636

(22) PCT Filed: Apr. 10, 2017

(86) PCT No.: PCT/JP2017/014692
§ 371 (c)(1),
(2) Date: Oct. 2, 2018

(87) PCT Pub. No.: WO2017/179543
PCT Pub. Date: Oct. 19, 2017

(65) Prior Publication Data
US 2019/0114483 A1 Apr. 18, 2019

(30) Foreign Application Priority Data
Apr. 14, 2016 (JP) .................. 2016-081007

(51) Int. Cl.
G06K 9/00 (2006.01)
G06T 7/70 (2017.01)
(Continued)

(52) U.S. Cl.
CPC ....... *G06K 9/00671* (2013.01); *G06K 7/1417* (2013.01); *G06K 9/46* (2013.01); *G06T 7/70* (2017.01)

(58) Field of Classification Search
CPC ........ G06K 9/00671; G06K 9/46; G06T 7/70; G06T 11/00
See application file for complete search history.

(56) References Cited

U.S. PATENT DOCUMENTS 9,558,467 B1 * 1/2017 Simon .................. G06Q 10/067
2007/0091125 A1 4/2007 Takemoto et al.
(Continued)

FOREIGN PATENT DOCUMENTS

JP 2002-278960 A 9/2002
JP 2006-214832 A 8/2006
(Continued)

OTHER PUBLICATIONS

International Search Report for PCT Application No. PCT/JP2017/014692, dated Jul. 4, 2017.
(Continued)

*Primary Examiner* — Grace Q Li

(57) ABSTRACT

The present invention stores information associated with an object such that the information can be displayed in display mode corresponding to the position of the object, even in a state wherein the object is not recognized. An information processing device 100 includes: an acquisition unit 110 that acquires an image; a recognition unit 120 that recognizes an object on the basis of the image acquired by the acquisition unit 110; and a storing unit 130 that stores, with second information relating to the position of the object, first information corresponding to the object, in the cases where the object is recognized by the recognition unit 120.

3 Claims, 13 Drawing Sheets

(51) Int. Cl.
    *G06K 7/14*           (2006.01)
    *G06K 9/46*           (2006.01)

(56) References Cited

U.S. PATENT DOCUMENTS

| | | | |
|---|---|---|---|
| 2011/0010122 A1* | 1/2011 | Ding | G06T 7/85 |
| | | | 702/95 |
| 2011/0249299 A1* | 10/2011 | Wu | G06K 9/2063 |
| | | | 358/3.26 |
| 2014/0022565 A1* | 1/2014 | Goto | H04N 1/2323 |
| | | | 358/1.2 |
| 2015/0029219 A1 | 1/2015 | Watanabe | |
| 2015/0310617 A1 | 10/2015 | Hara | |
| 2016/0217616 A1* | 7/2016 | Kraver | G06F 3/012 |
| 2016/0327946 A1* | 11/2016 | Koga | B64C 39/024 |

FOREIGN PATENT DOCUMENTS

| | | |
|---|---|---|
| JP | 2012-175666 A | 9/2012 |
| JP | 2015-022737 A | 2/2015 |
| JP | 2015-114933 A | 6/2015 |
| JP | 2015-194954 A | 11/2015 |
| JP | 2015-211363 A | 11/2015 |

OTHER PUBLICATIONS

English translation of Written opinion for PCT Application No. PCT/JP2017/014692.

* cited by examiner

|  | M01 | M02 | M03 | M04 | M05 |
|---|---|---|---|---|---|
| M01 |  | (12,-25,0) | (30,-20,0) | UNKNOWN | UNKNOWN |
| M02 |  |  | (18,12,0) | UNKNOWN | UNKNOWN |
| M03 |  |  |  | (10,-27,0) | (30,-18,0) |
| M04 |  |  |  |  | (19,15,0) |
| M05 |  |  |  |  |  |

INFORMATION PROCESSING DEVICE, INFORMATION PROCESSING METHOD, AND PROGRAM STORING MEDIUM

This application is a National Stage Entry of PCT/JP2017/014692 filed on Apr. 10, 2017, which claims priority from Japanese Patent Application 2016-081007 filed on Apr. 14, 2016, the contents of all of which are incorporated herein by reference, in their entirety.

TECHNICAL FIELD

The present disclosure relates to an information processing device and the like.

BACKGROUND ART

A technique for recognizing an object and displaying information according to the recognized object has been known. For example, PTL 1 discloses a technique for recognizing a marker and then displaying an image associated with the marker. Further, PTL 2 discloses a technique for associating a plurality of augmented reality (AR) contents with one marker.

CITATION LIST

Patent Literature

PTL 1: JP 2015-194954 A
PTL 2: JP 2015-022737 A

SUMMARY OF INVENTION

Technical Problem

When information of this kind is displayed, a marker is not always recognizable. For example, in the techniques disclosed in PTLs 1 and 2, when the marker is hidden by a shield other than the marker or the marker is not located in an appropriate position due to detachment of the marker, intended information is unable to be displayed.

An illustrative object of the present disclosure is to store information associated with an object in such a way that the information is able to be displayed in a display mode according to a position of the object even in a situation where the object is not recognized.

Solution to Problem

In first aspect, an information processing device is provided. The information processing device includes an acquisition means for acquiring an image, a recognition means for recognizing an object from an image acquired by the acquisition means, and a storing means for storing, when an object is recognized by the recognition means, first information associated with the object together with second information about a position of the object.

In second aspect, an information processing method is provided. The information processing method includes acquiring an image, recognizing an object from an image acquired, and storing, when an object is recognized, first information associated with the object together with second information about a position of the object.

In third aspect, a computer-readable program storing medium is provided. The medium stores a program. The program causes a computer to execute acquiring an image, recognizing an object from an image acquired, and storing, when an object is recognized, first information associated with the object together with second information about a position of the object.

Advantageous Effects of Invention

According to the present disclosure, information associated with an object is able to be stored in such a way that the information can be displayed in a display mode according to a position of the object even in a situation where the object is not recognized.

EXAMPLE EMBODIMENT

First Example Embodiment

Figure 1:
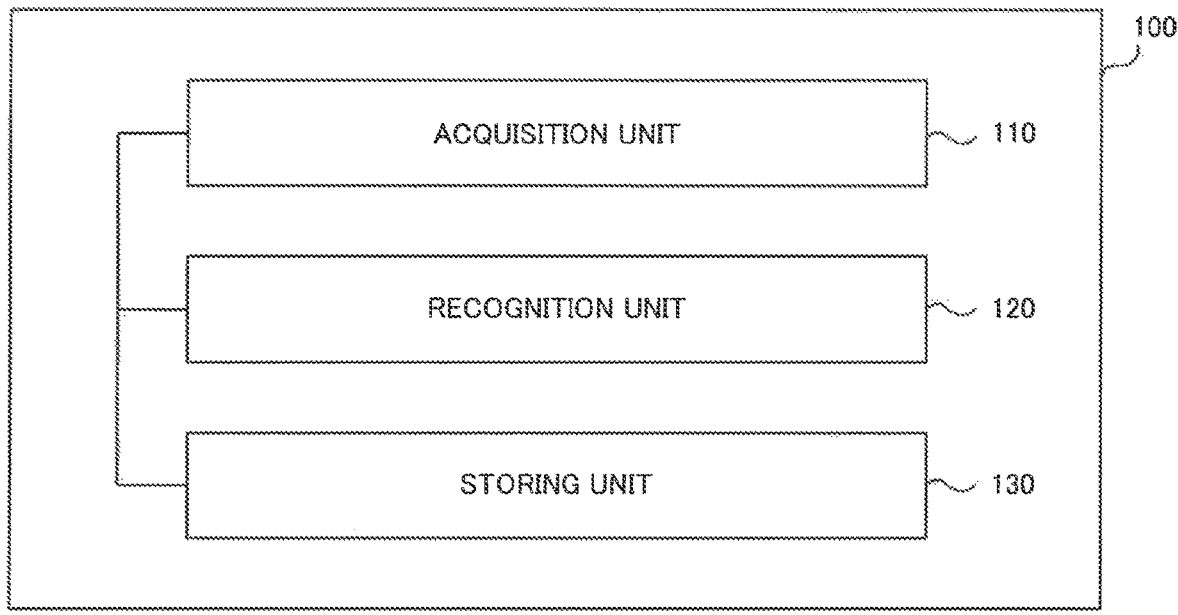
FIG. 1 is a block diagram illustrating one example of a configuration of an information processing device.

FIG. 1 is a block diagram illustrating a configuration of an information processing device 100 according to one example embodiment. The image processing device 100 includes an acquisition unit 110, a recognition unit 120, and a storing unit 130. The information processing device 100 may include another structural component as necessary. A part or the whole of a configuration of the information processing device 100 may be implemented by software.

The acquisition unit 110 acquires an image. The acquisition unit 110 acquires an image by, for example, receiving an input of image data from another device (such as a digital camera and a storing device). An image acquired by the acquisition unit 110 is not necessarily limited to specific size and color depth. An image acquired by the acquisition unit 110 may be a monochrome image or a color image. The acquisition unit 110 is able to acquire a plurality of images.

The recognition unit 120 recognizes a predetermined object from an image. The recognition unit 120 is able to recognize an object from an image acquired by the acquisition unit 110 by using a known object recognition technique. The object recognition technique herein may be general object recognition or specific object recognition. For example, the recognition unit 120 may recognize an object by extracting features of an image on the basis of a predetermined feature value.

In some aspects, the recognition unit 120 is configured to recognize a specific item and a specific sign. For example, the recognition unit 120 is able to recognize a two-dimensional code (also referred to as a two-dimensional bar code) and an AR marker used in an AR system. The recognition unit 120 may recognize a portion in which a color or a shape has a certain feature in an image as a predetermined object.

The storing unit 130 stores information about an object recognized from an image. The storing unit 130 is configured to store information in a predetermined storing medium inside or outside the information processing device 100. When an object is recognized by the recognition unit 120, the storing unit 130 stores information about the recognized object. When a plurality of objects are recognized by the recognition unit 120, the storing unit 130 associates information about the plurality of objects recognized.

When an object is recognized by the recognition unit 120, the storing unit 130 stores information associated with the object (hereinafter also referred to as "first information") together with information about a position of the object (hereinafter also referred to as "second information"). The first information is, for example, information identifying the object recognized by the recognition unit 120 or information extracted from the object. For example, when a surface of the object recognized by the recognition unit 120 includes a character or an image, the first information is stored on the basis of the character or the image. The first information may be image data indicating the object itself recognized by the recognition unit 120. The second information is, for example, information in which the position (namely, coordinates) of the object recognized by the recognition unit 120 is described by using a predetermined coordinate system. The first information and the second information correspond to one example of information about the object.

Further, when a plurality of objects are recognized by the recognition unit 120, the storing unit 130 may store information according to a positional relationship between the plurality of objects as the second information. The second information in this case is, for example, information in which positions of the plurality of objects recognized by the recognition unit 120 are incorporated by using a common coordinate system. The second information may include data indicating a distance between the plurality of objects and data indicating another direction with one of the plurality of objects as a reference.

Figure 2:
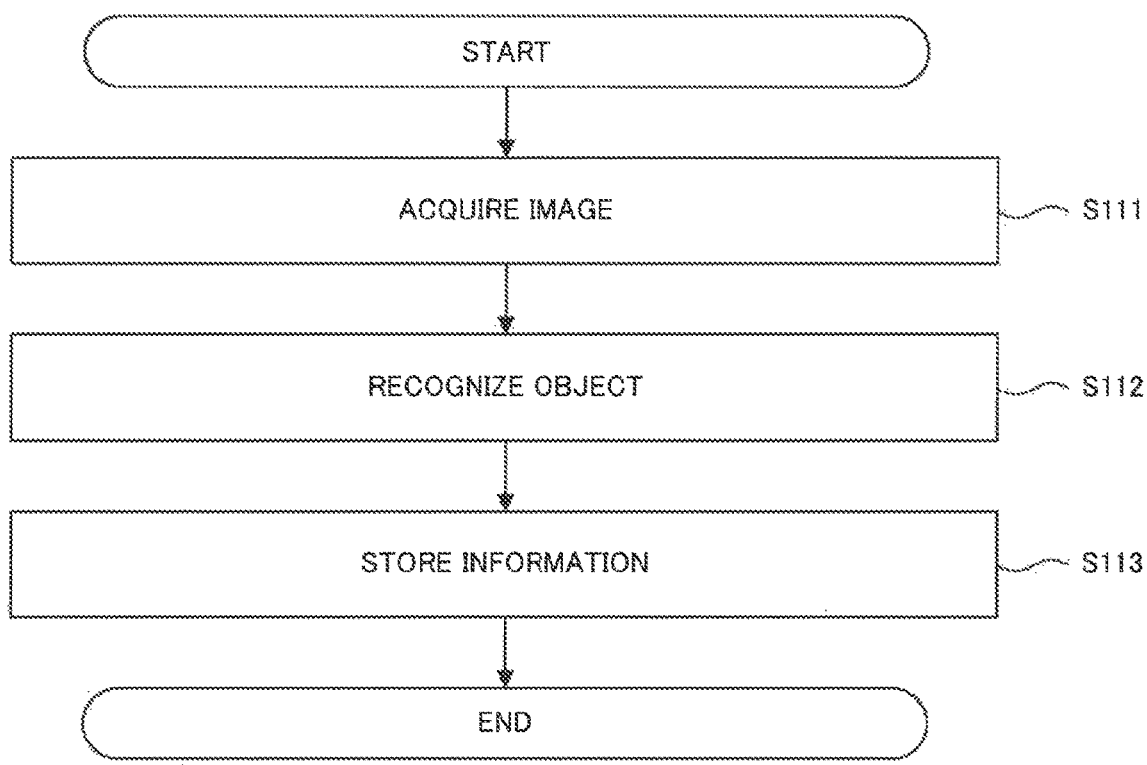
FIG. 2 is a flowchart illustrating one example of processing performed by the information processing device.

FIG. 2 is a flowchart illustrating processing performed by the information processing device 100. In Step S111, the acquisition unit 110 acquires an image. In Step S112, the recognition unit 120 recognizes an object from the image acquired by the acquisition unit 110. The object herein is assumed to be included in a part of the image instead of the whole image.

Note that, in Step S112, the recognition unit 120 may not always recognize an object from an image. For example, when a recognizable object is not included in an image, the recognition unit 120 fails to recognize an object. Therefore, it can be said that the processing in Step S112 is processing of attempting to recognize an object. When an object cannot be recognized in Step S112, the information processing device 100 terminates the processing without performing processing on and after Step S113.

When an object is recognized in Step S112, the storing unit 130 stores information about the object in Step S113. Particularly, when a plurality of objects are recognized in Step S112, the storing unit 130 stores the first information and the second information about the plurality of objects.

As described above, the information processing device 100 according to the present example embodiment has the configuration that stores the first information together with the second information when an object is recognized. This configuration allows information about a position of a recognized object, namely, the second information to be read together with the first information. Therefore, according to the information processing device 100, the first information associated with an object is able to be stored in such a way that the first information can be displayed in a display mode according to a position of the object even in a situation where the object is not recognized.

Further, the information processing device 100 according to the present example embodiment has the configuration that stores the first information together with the second information when a plurality of objects are recognized. This configuration allows the second information according to a positional relationship between a plurality of recognized objects to be read together with the first information. Therefore, according to the information processing device 100, the first information associated with an object is able to be stored in such a way that the first information can be displayed in a display mode according to a positional relationship between a plurality of objects even in a situation where at least a part of the plurality of objects is not recognized.

Second Example Embodiment

Figure 3:
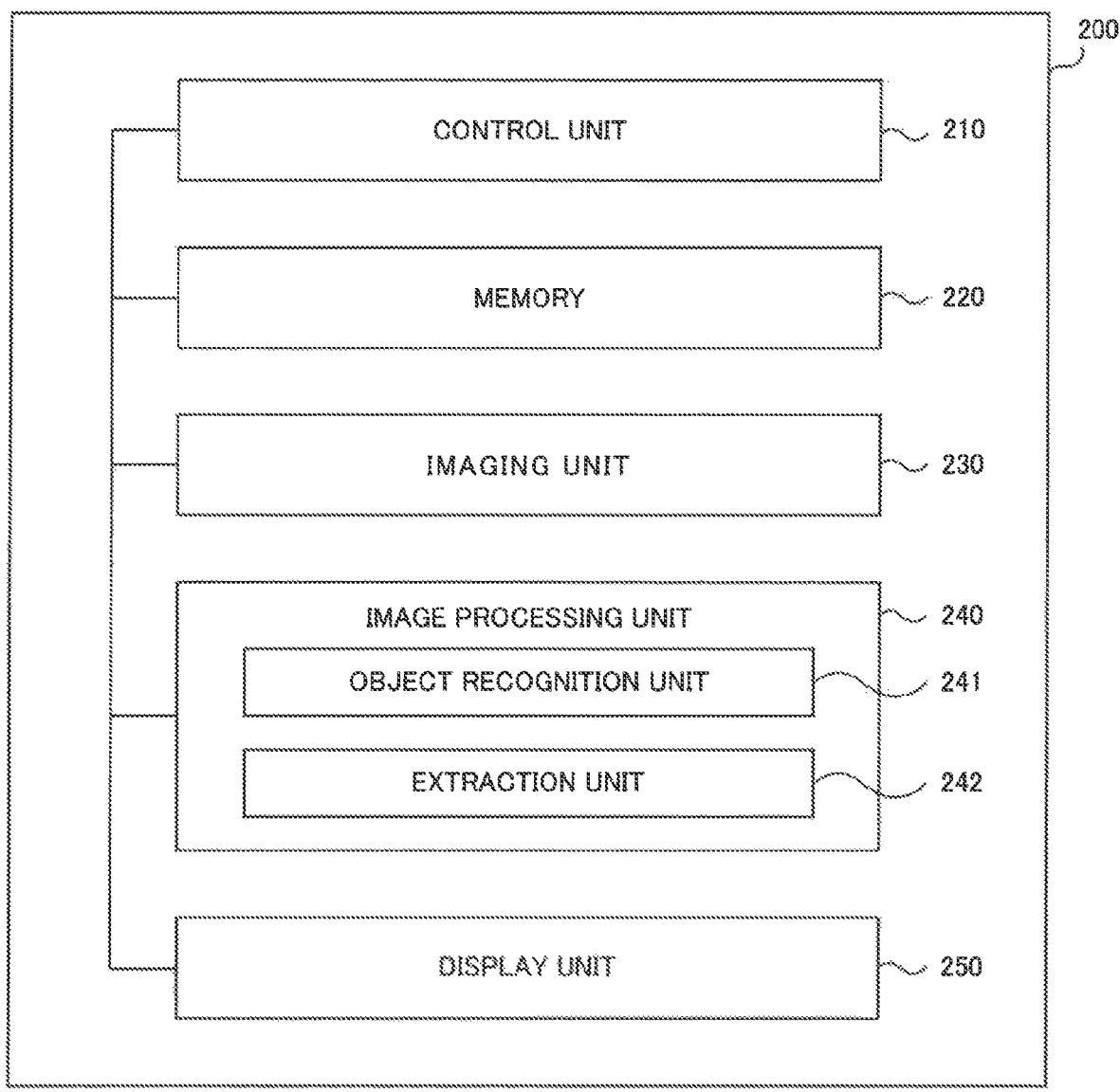
FIG. 3 is a block diagram illustrating another example of a configuration of an information processing device.

FIG. 3 is a block diagram illustrating a configuration of an information processing device 200 according to another example embodiment. The information processing device 200 includes a control unit 210, a memory 220, an imaging unit 230, an image processing unit 240, and a display unit 250. The information processing device 200 may include another structural component (such as an input device).

The information processing device 200 is, for example, a portable electronic apparatus such as a smartphone or a tablet terminal. Alternatively, the information processing device 200 may be a wearable device such as a head mounted display (HMD). However, specific shape and size of the information processing device 200 are not particularly limited.

Note that, in the present example embodiment and subsequent example embodiments, the same term as the term described in the first example embodiment is used to mean the same as in the first example embodiment except for when the term particularly has a definition or description.

The control unit 210 controls operations of the information processing device 200. The control unit 210 includes one or a plurality of arithmetic processing devices such as a central processing unit (CPU) and a memory, and controls operations of the information processing device 200 by executing a program. The control unit 210 corresponds to one example of the storing unit 130 in the first example embodiment.

The memory 220 stores data. The memory 220 includes a storing medium such as a hard disk and a flash memory. The memory 220 may have a configuration that gives and receives data to and from a removable storing medium such as a memory card. The memory 220 is able to store data including a program and image data needed for operations of the information processing device 200. The control unit 210 is able to write data to the memory 220 and read data stored in the memory 220.

The imaging unit 230 captures an image. The imaging unit 230 includes an optical detector such as a complementary metal oxide semiconductor (CMOS) image sensor. The imaging unit 230 generates image data indicating a captured image. In the following description, an image indicated by image data generated in capturing is also referred to as a "captured image". The imaging unit 230 corresponds to one example of the acquisition unit 110 in the first example embodiment.

The image processing unit 240 performs predetermined image processing. The image processing unit 240 includes, for example, one or a plurality of image processing processors. The image processing unit 240 may be configured by a part of the control unit 210 instead of being formed as an individual structural component.

More specifically, the image processing unit 240 includes an object recognition unit 241 and an extraction unit 242. The object recognition unit 241 recognizes an object from an image. The object recognition unit 241 corresponds to one example of the recognition unit 120 in the first example embodiment. The extraction unit 242 extracts information from the object recognized by the object recognition unit 241. Hereinafter, information extracted by the extraction unit 242 is also referred to as "additional information". The additional information includes, for example, information that is optically readable from a surface of an object recognized by the object recognition unit 241.

The display unit 250 displays information. The display unit 250 includes a display device such as a liquid crystal display and a projector. The display unit 250 is able to display a captured image captured by the imaging unit 230. Further, the display unit 250 is also able to display an image according to data stored in the memory 220.

The information processing device 200 has the configuration as described above. With this configuration, the information processing device 200 is able to recognize an object from a captured image and stored information according to the recognized object. Further, the information processing device 200 is able to display the stored information.

In the present example embodiment, the information processing device 200 is configured to recognize a control panel. The control panel herein is an object including a gauge, an indicator, or an operating device (such as a switch and a knob). The control panel is used in manufacturing a product, maintaining a facility, or maintenance. Examples of an object similar to the control panel include a display panel, an operation panel, and an alarm panel.

Figure 4:
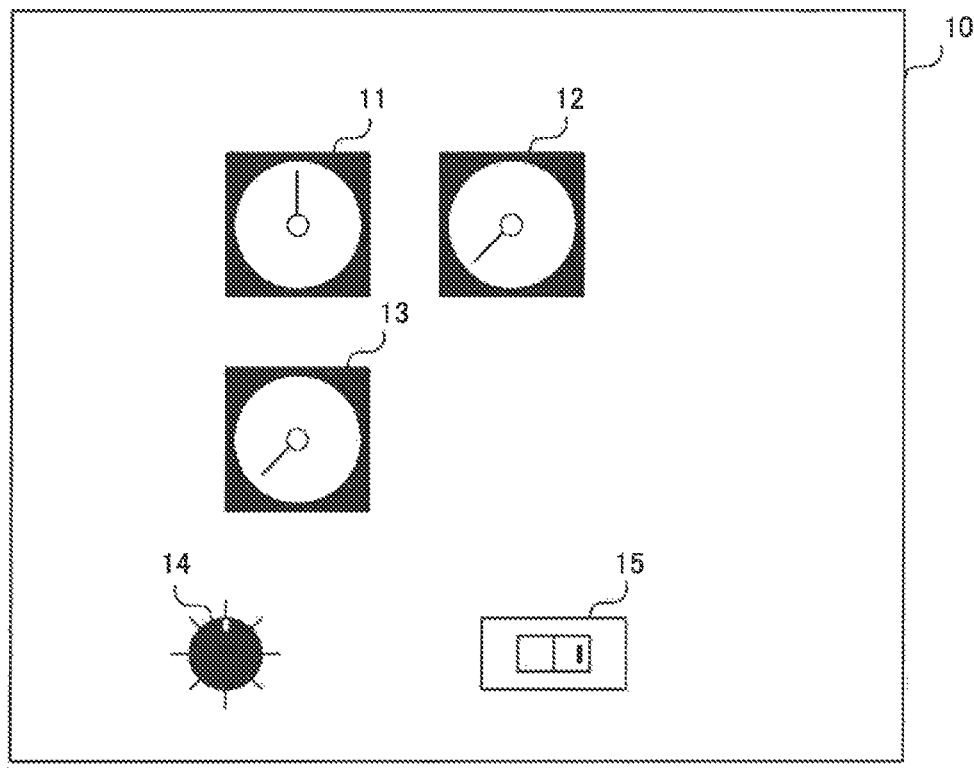
FIG. 4 is a diagram illustrating one example of a control panel.

FIG. 4 is a diagram illustrating one example of a control panel. In this example, a control panel 10 includes gauges 11, 12, and 13, a dial 14, and a switch 15. Each of the gauges 11, 12, and 13 displays predetermined measured quantity (such as weight, pressure, temperature, and speed). The dial 14 and the switch 15 are one example of an input device. The dial 14 is an input device for inputting a numerical value. The switch 15 is an input device for switching between on and off.

The control panel 10 is visually checked by an operator in an inspection operation. However, an operator in this inspection operation is not always the same person. In the present example embodiment, an operator uses the information processing device 200 to check an operation procedure and a check item in the inspection operation.

In the present example embodiment, the information processing device 200 displays information needed for an operator. The operator previously performs an operation of registering information to allow display by the information processing device 200. In the present example embodiment, the operator is able to perform the operation of registering information by attaching a predetermined label sheet to the control panel 10.

Figure 5:
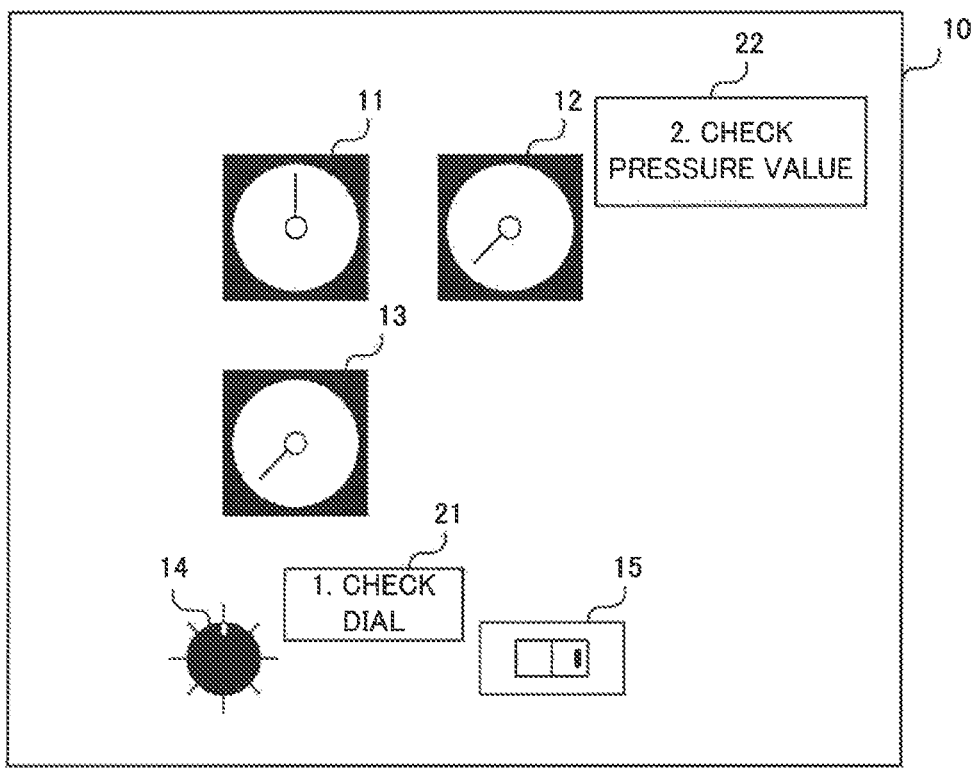
FIG. 5 is a diagram illustrating one example of attaching a label sheet.

FIG. 5 is a diagram illustrating one example of attaching a label sheet in the present example embodiment. In this example, label sheets 21 and 22 are attached to the control panel 10. Handwritten characters indicating that the dial 14 needs to be checked first are written on the label sheet 21. Handwritten characters indicating that the gauge 12 needs to be checked after the dial 14 are written on the label sheet 22.

In the present example embodiment, the label sheets 21 and 22 have a feature that can be distinguished from another object in such a way that, for example, at least any of color and shape is predetermined. For example, the operator uses a label sheet having a specific color and a specific shape in the registration operation.

After attaching the label sheets in such a manner, the operator uses the information processing device 200 to capture the control panel 10. In the present example embodiment, the operator captures the entire control panel 10 from the front at this time. The information processing device 200 recognizes the control panel 10 and the label sheets 21 and 22 from a captured image by registration processing described later. Note that, the operator may remove the label sheets 21 and 22 when a series of processing by the information processing device 200 is completed. In other words, the label sheets 21 and 22 do not need to be permanently attached.

Figure 6:
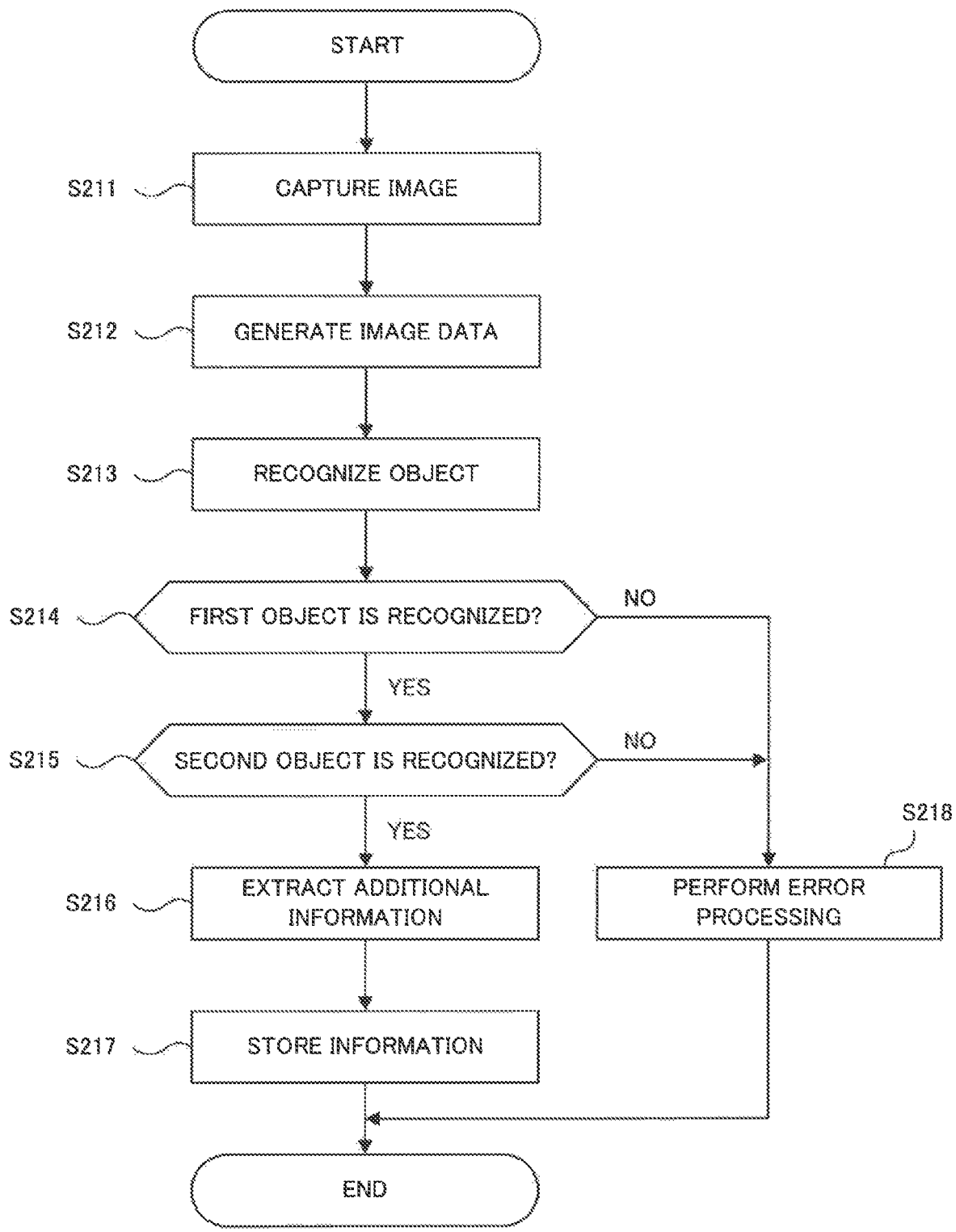
FIG. 6 is a flowchart illustrating one example of registration processing.

FIG. 6 is a flowchart illustrating registration processing performed by the information processing device 200. In Step S211, the imaging unit 230 captures an image. In Step S212, the imaging unit 230 generates image data indicating the captured image. The imaging unit 230 may repeat capturing at predetermined time intervals and generate a plurality of pieces of image data.

In Step S213, the object recognition unit 241 recognizes an object on the basis of the image data generated in Step S212. The object recognition unit 241 recognizes objects of two kinds that satisfy a predetermined condition. Hereinafter, these objects are referred to as a "first object" and a "second object".

In the present example embodiment, the first object and the second object each have a certain tendency (namely, feature) of its external appearance (such as shape and color). The first object is the control panel 10 in the present example embodiment. The second object is the label sheets 21 and 22 in the present example embodiment. In some aspects, images (or image features) of the first object and the second object are previously stored in a database and the like. The object recognition unit 241 is able to recognize the first object and the second object by referring to the database.

In Step S214, the object recognition unit 241 determines whether or not the first object is recognized. In Step S215, the object recognition unit 241 determines whether or not the second object is recognized. Note that, the processing order of Steps S214 and S215 may be reversed.

When the first object and the second object are recognized (YES in S214 and YES in S215), the extraction unit 242 extracts additional information from the second object in Step S216. For example, the additional information in the present example embodiment is image data indicating the handwritten characters written on the label sheets 21 and 22. Note that, the object recognition unit 241 may convert the handwritten characters into text data (namely, a character code) by an optical character recognition (OCR) technology. In this case, the additional information may include text data.

In Step S217, the control unit 210 stores first information and second information in the memory 220. The first information in the present example embodiment is the additional information extracted in Step S216. The second information in the present example embodiment is coordinate information calculated as follows.

Figure 7:
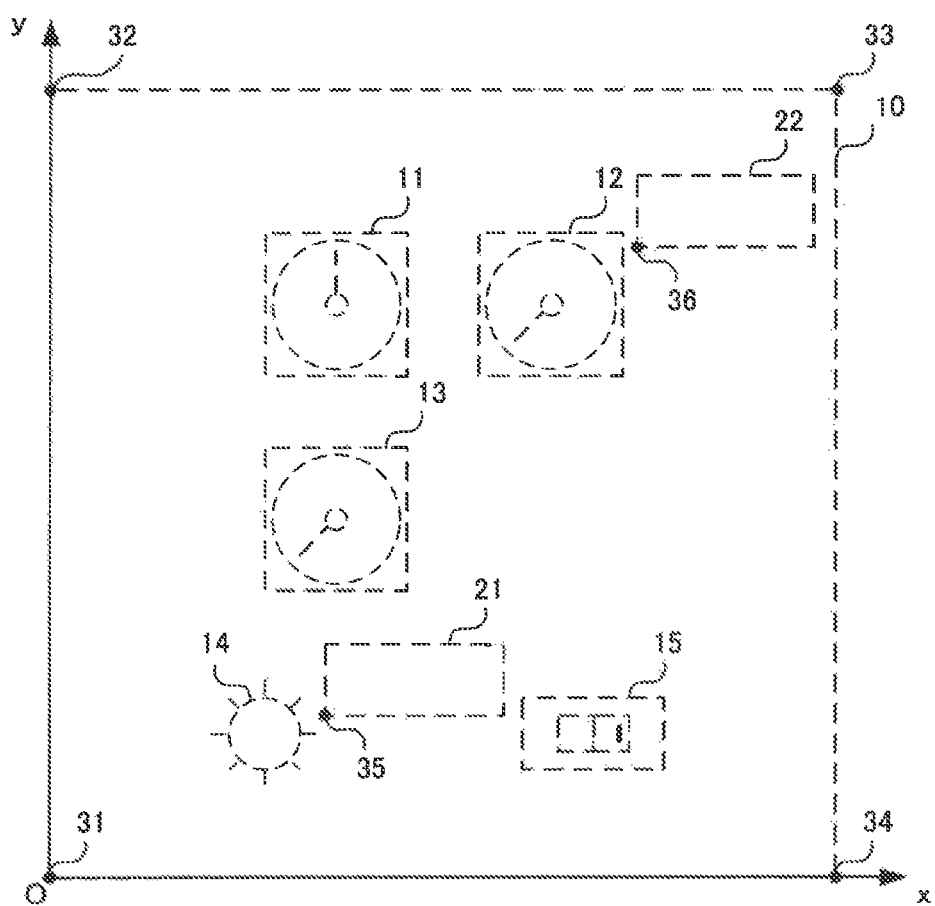
FIG. 7 is a diagram illustrating one example of coordinate information.

FIG. 7 is a diagram illustrating one example of coordinate information. The control unit 210 defines an orthogonal coordinate system with an appropriate position (lower left end of the control panel 10 in FIG. 7) of a captured image as an origin. The control unit 210 stores coordinates 31, 32, 33, and 34 as coordinate information about the control panel 10. The control unit 210 also stores coordinates 35 and 36 indicating predetermined positions (lower left ends in FIG. 7) of the label sheets 21 and 22 as pieces of coordinate information about the label sheets 21 and 22.

The control unit 210 stores these pieces of coordinate information and the additional information while associating the pieces of coordinate information and the additional information with the first object, namely, the control panel 10. For example, the control unit 210 assigns predetermined identification information to the control panel 10 and stores the coordinate information and the additional information while associating the coordinate information and the additional information with the identification information in the memory 220.

Note that, when the first object or the second object is not recognized (NO in S214 or NO in S215), the control unit 210 performs predetermined error processing in Step S218 without performing the processing in Steps S216 and S217. The error processing is, for example, processing of notifying a user that an object fails to be recognized and prompting the user to capture again.

The information processing device 200 performs registration processing by the registration operation being performed by the operator. As a result, the coordinate information and the additional information associated with the control panel 10 are stored in the memory 220. While the coordinate information and the additional information are stored, the operator uses the information processing device 200 to perform the inspection operation. In the inspection operation, the operator captures the control panel 10 as in the registration operation. At this time, the information processing device 200 performs the following display processing.

Figure 8:
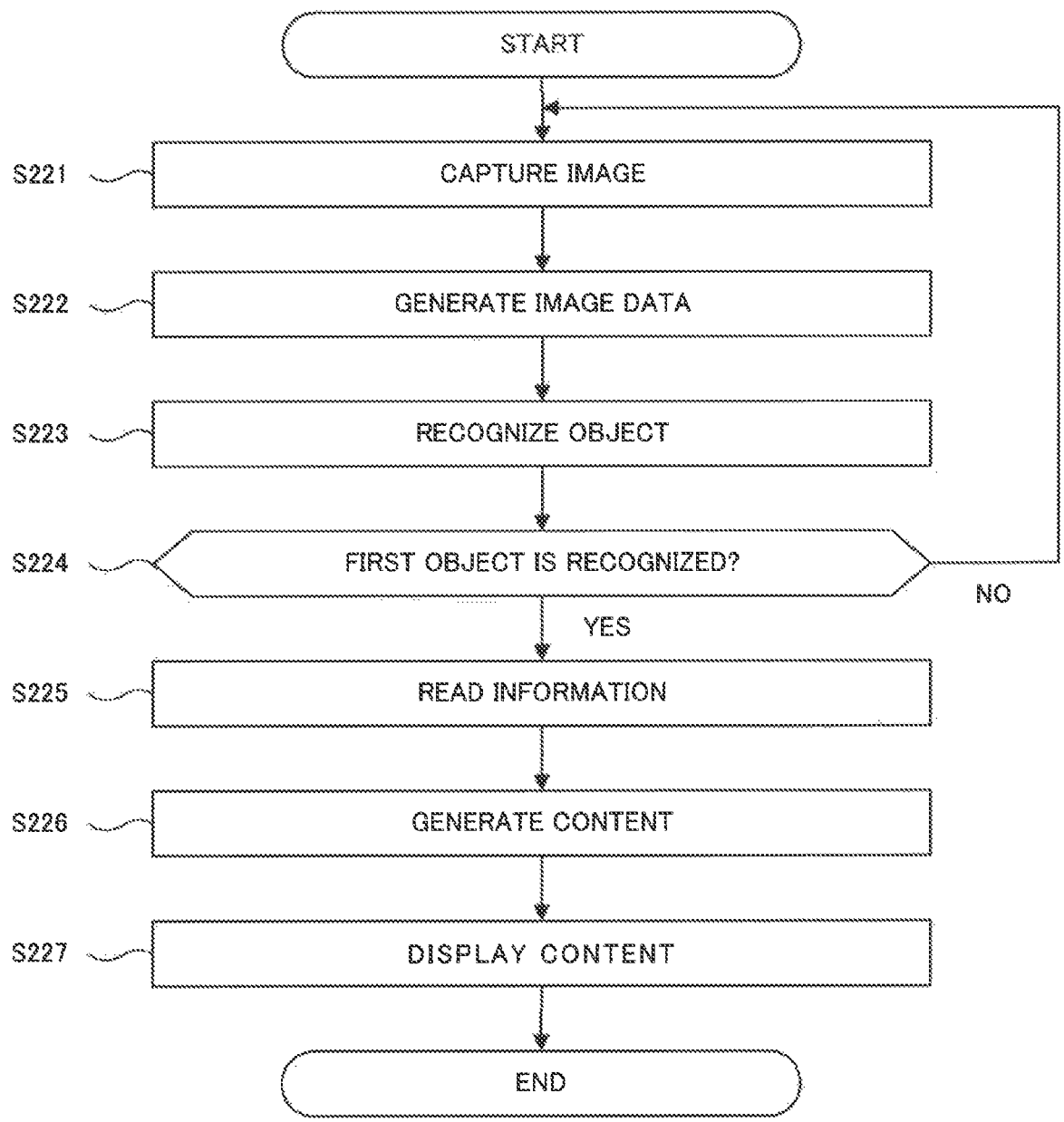
FIG. 8 is a flowchart illustrating one example of display processing.

FIG. 8 is a flowchart illustrating display processing performed by the information processing device 200. In Step S221, the imaging unit 230 captures an image. In Step S222, the imaging unit 230 generates image data indicating the captured image. The processings in Steps S221 and S222 are identical to the processings in Steps S211 and S212 in the registration processing. However, the processings in Steps S221 and S222 are different from the processings in Steps S211 and S212 in the registration processing in that the processings in Steps S221 and S222 are performed after the registration processing has already been performed.

In Step S223, the object recognition unit 241 recognizes an object on the basis of the image data generated in Step S222. The processing in Step S223 is also identical to the processing in Step S213 in the registration processing. However, in Step S223, the object recognition unit 241 does not need to recognize the second object as long as the object recognition unit 241 recognizes the first object.

In Step S224, the object recognition unit 241 determines whether or not the first object is recognized. Specifically, at this time, the object recognition unit 241 determines whether or not an object regarded as identical to the object having the first information and the second information stored in Step S217 in the registration processing is recognized. When the first object is not recognized (NO in S224), the control unit 210 captures an image again and performs the processing on and after Step S221 again.

Note that, the first object recognized in Step S224 does not need to be an object identical to the first object recognized in Step S214. In other words, the first object recognized in Step S224 needs only to be an object that can be recognized by the object recognition unit 241 as an object identical to the first object recognized in Step S214. For example, a control panel recognized in Step S224 may be a different control panel that is installed at a place different from the control panel 10 to which the label sheets 21 and 22 are attached and has an external appearance identical to that of the control panel 10.

When the first object is recognized (YES in S224), the control unit 210 performs processing in Step S225. Specifically, the control unit 210 reads the first information (additional information) and the second information (coordinate information) stored in Step S217 from the memory 220. In Step S226, the control unit 210 generates a content according to the additional information read from the memory 220 in Step S225.

In Step S227, the control unit 210 causes the display unit 250 to display the content generated in Step S226. In other words, the display unit 250 displays the content generated in Step S226. At this time, the display unit 250 may superimpose the content on the captured image and display the content.

Figure 9:
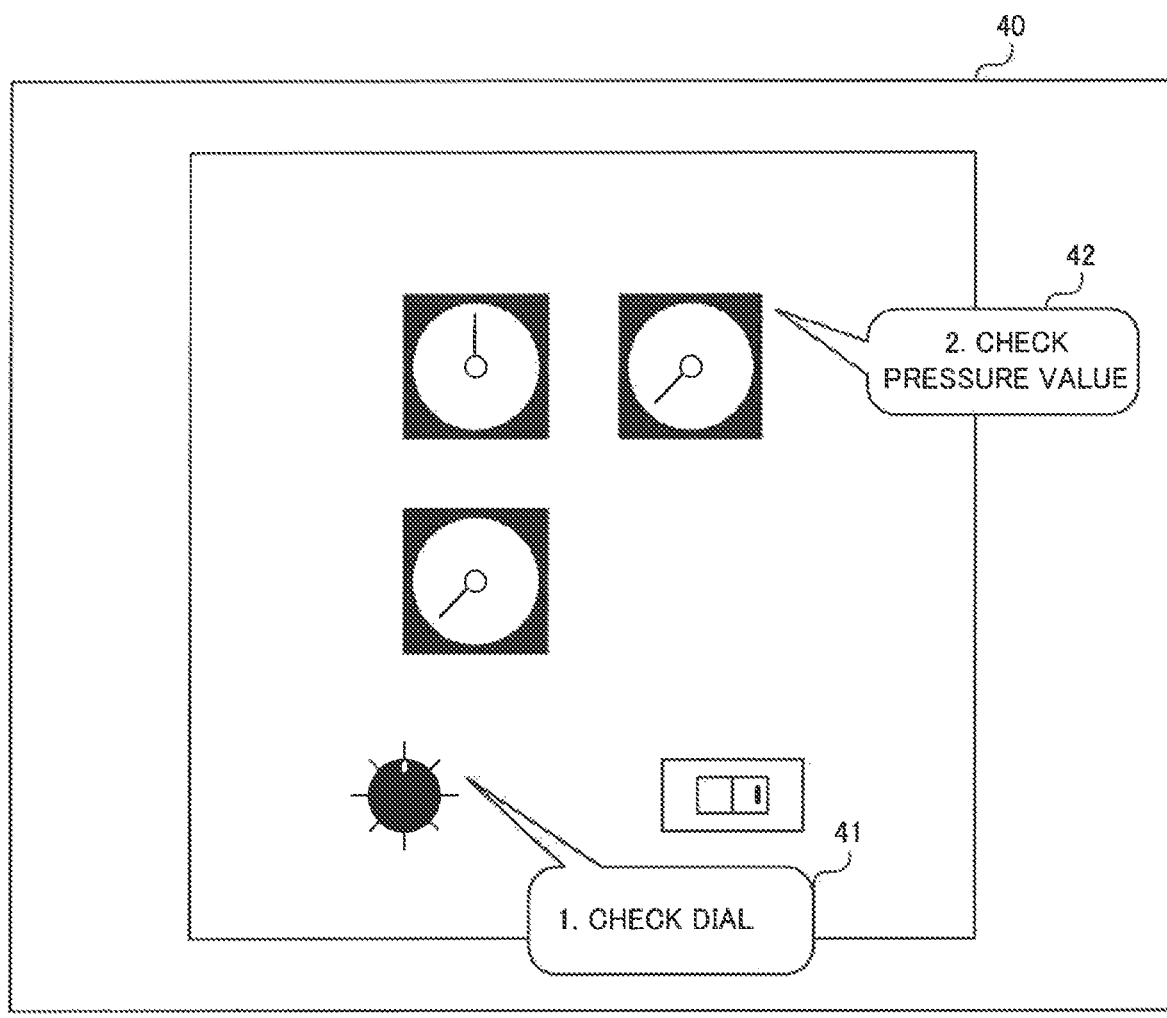
FIG. 9 is a diagram illustrating one example of display of a content.

FIG. 9 is a diagram illustrating one example of display of a content. The display unit 250 displays a captured image 40 and contents 41 and 42. The content 41 is one example of a content corresponding to the label sheet 21. The content 42 is one example of a content corresponding to the label sheet 22.

The control unit 210 determines display positions of the contents 41 and 42 on the basis of the coordinate information stored in Step S217. In the example of FIG. 9, the control unit 210 determines display positions of the contents 41 and 42 in such a way that tips of balloons constituting outer frames of the contents 41 and 42 coincide with positions indicated by the coordinate information. Note that, shapes of the outer frames of the contents 41 and 42 may not coincide with shapes of the label sheets 21 and 22. However, the control unit 210 may determine shapes of the outer frames of the contents 41 and 42 similar to shapes of the label sheets 21 and 22. Further, the control unit 210 may cause the contents 41 and 42 to be displayed in the same positions as positions in which the label sheets 21 and 22 are displayed.

Note that, the control unit 210 may cause the contents 41 and 42 to be displayed in predetermined order. For example, the control unit 210 may cause the content 41 to be displayed first and the content 42 to be displayed after a predetermined period of time on the basis of ordinal numbers recognized from the label sheets 21 and 22 ("1" of the label sheet 21 and "2" of the label sheet 22). The display order of contents may be determined on the basis of other information (such as color and shape) that can be recognized from label sheets.

As described above, the information processing device 200 according to the present example embodiment has the configurations related to the acquisition unit 110, the recognition unit 120, and the storing unit 130 of the information processing device 100 in the first example embodiment, and thereby the operational effects identical to those of the information processing device 100 is able to be achieved. Further, the information processing device 200 has the configuration that stores information about the second object (label sheet) while associating the information about the second object with the first object (control panel). This configuration allows a content associated with the second object to be displayed in a display mode according to a positional relationship between the first object and the second object even in a situation where the second object is not recognized.

Further, the information processing device 200 has the configuration that is able to perform both of the registration processing and the display processing. This configuration allows, after information about the second object is registered on the basis of a certain captured image, a content according to the information to be displayed on the basis of another captured image.

Third Example Embodiment

Figure 10:
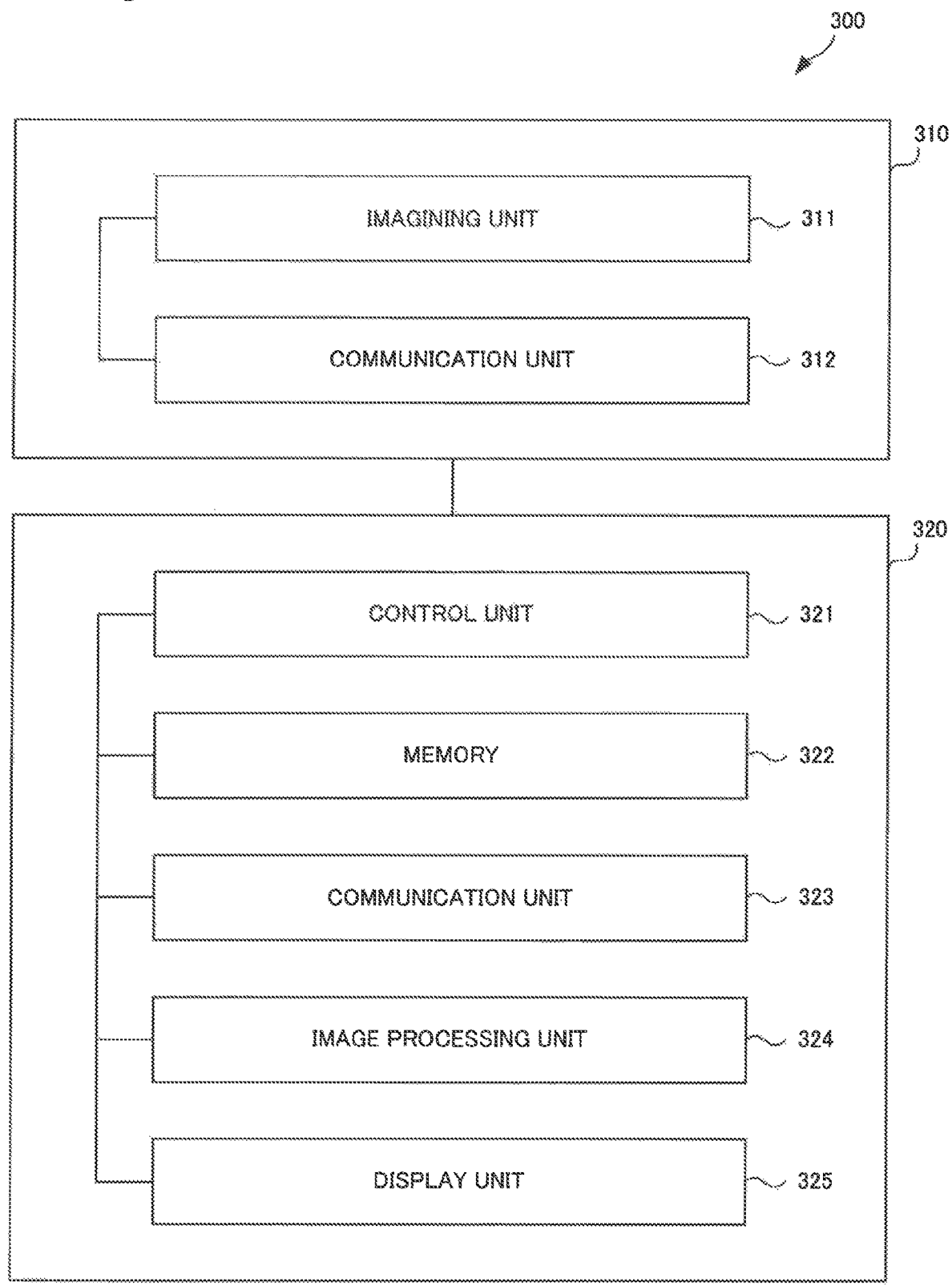
FIG. 10 is a block diagram illustrating one example of a configuration of an information processing system.

FIG. 10 is a block diagram illustrating a configuration of an information processing device 300 according to still another example embodiment. The information processing system 300 includes an imaging device 310 and a display device 320.

The imaging device 310 captures an image. The imaging device 310 is, for example, a digital camera or a wearable device. The imaging device 310 includes an imaging unit 311 and a communication unit 312. The imaging unit 311 has a configuration identical to that of the imaging unit 230 in the second example embodiment. The imaging unit 311 generates image data indicating a captured image. The communication unit 312 transmits the image data to the display device 320 in a wired or wireless manner.

Note that, the imaging device 310 may store the image data in a removable storing medium such as a memory card. In this case, the display device 320 does not need a configuration corresponding to the communication unit 230. In such a case, the display device 320 may be configured to read image data from a storing medium in which the image data is stored.

Further, the imaging unit 311 may include a function of capturing a moving image. In other words, the captured image herein may include a moving image. The imaging unit 311 may also include a function of capturing a plurality of still images instead of the function of capturing a moving image.

The display device 320 includes a control unit 321, a memory 322, a communication unit 323, an image processing unit 324, and a display unit 325. The display device 320 has a configuration identical to that of the information processing device 200 in the second example embodiment except for that the display device 320 includes the communication unit 323 instead of the imaging unit 230. However, image processing performed by the image processing unit 324 is partly different from the image processing performed by the image processing unit 240.

The information processing system 300 has the configuration as described above. With this configuration, the imaging device 310 captures an image and transmits image data. Further, the display device 320 recognizes an object from the image data and stores information according to the recognized object. The display device 320 also displays a content according to the stored information.

An object being a target to be recognized in the present example embodiment is a label sheet attached to a whiteboard. For example, a user writes a character or a figure on a whiteboard or attaches a label sheet to the whiteboard in a meeting such as a brainstorming meeting. The user is able to store information according to a captured image in the display device 320 by capturing the whiteboard by using the imaging device 310. Further, the user is able to view a content associated with information stored in the display device 320 by using the display device 320.

The label sheet in the present example embodiment has a predetermined format. Specifically, the label sheet in the present example embodiment includes a figure capable of distinguishing the label sheet from another label sheet and specifying a position and a posture seen from the imaging unit 311. This figure is, for example, a two-dimensional code or an AR marker.

Figure 11:
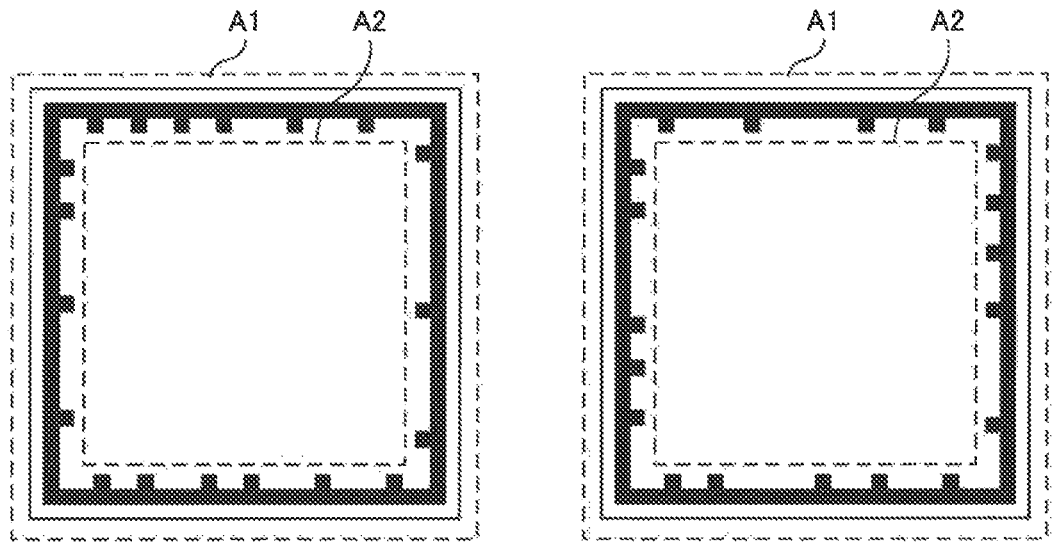
FIG. 11 is a diagram illustrating one example of a label sheet.

FIG. 11 is a diagram exemplifying the label sheet in the present example embodiment. In this example, the label sheet includes a marker region A1 and an information written region A2. The marker region A1 is a region in which a frame line having a predetermined size and dot-shaped code information are previously printed by a printer and the like. A shape of the frame line of the marker region A1 is a square in the present example embodiment. Further, the code information has dots in positions varying among label sheets, and thereby label sheets become distinguishable from one another. The figure formed in the marker region A1 is also referred to as a "marker" below. The information written region A2 is a region in which a user writes a character or a figure.

The display device 320 is able to specify a distance between the label sheet and the imaging device 310 from the size of the frame line in the captured image. Further, the display device 320 may specify an inclination in a depth direction of the label sheet seen from the imaging device 310 from distortion of the frame line in the captured image, namely, a degree of deformation from the square.

Note that, a part of the label sheet may be used to specify a position of a whiteboard. In this case, the user attaches the label sheet in a predetermined position of the whiteboard. For example, the user attaches the label sheet in a corner of the whiteboard. In this way, the information processing system 300 is able to easily recognize a position, a size, a boundary, and the like of the whiteboard.

Figure 12:
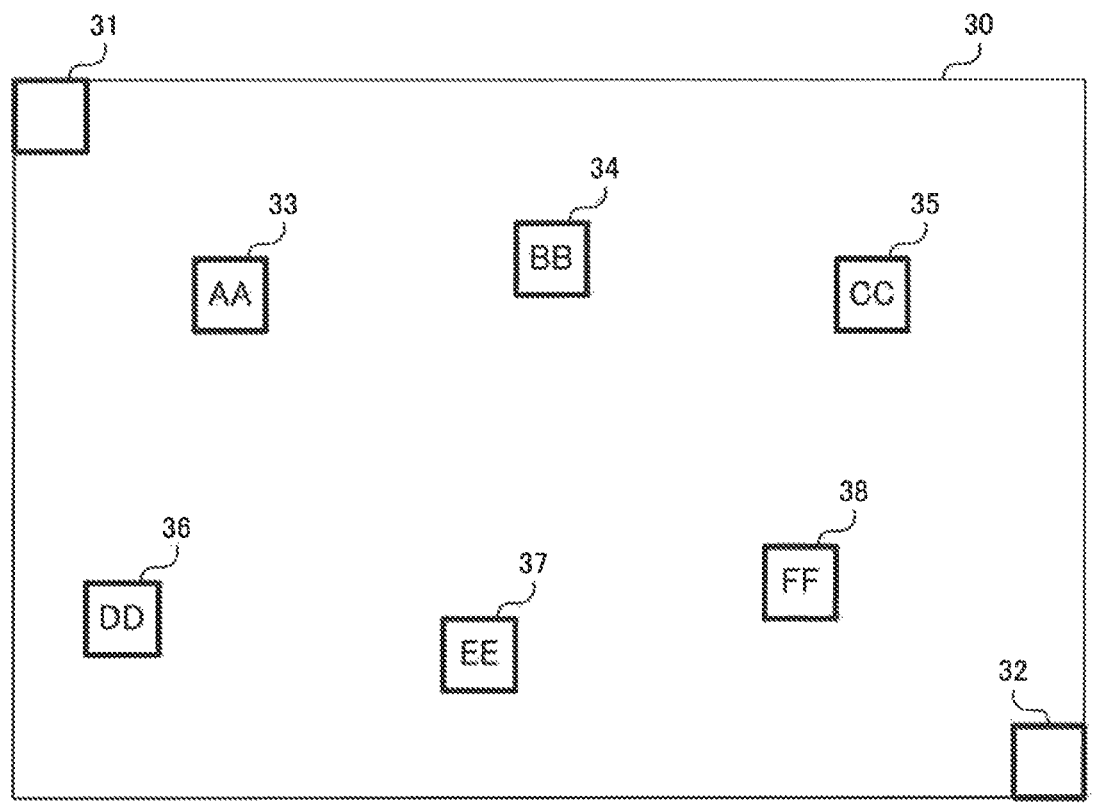
FIG. 12 is a diagram illustrating one example of attaching a label sheet.

FIG. 12 is a diagram illustrating one example of attaching a label sheet in the present example embodiment. In this example, label sheets 31 and 32 are attached to two corners (upper left and lower right) of a whiteboard 30 that are not adjacent to each other. The label sheets 31 and 32 are attached for the information processing system 300 to recognize a position of the whiteboard 30. Thus, the user does not need to write a character or a figure in the information written region A2 of the label sheets 31 and 32. On the other hand, label sheets 33, 34, 35, 36, 37, and 38 are attached in arbitrary positions by the user.

After attaching the label sheets, the user captures the whiteboard with the imaging device 310. The user captures the entire whiteboard by one or a plurality of times of capturing. For example, when a character or the like written on the label sheet cannot be recognized from the captured image, the user may come closer to the whiteboard and perform capturing.

Figure 13:
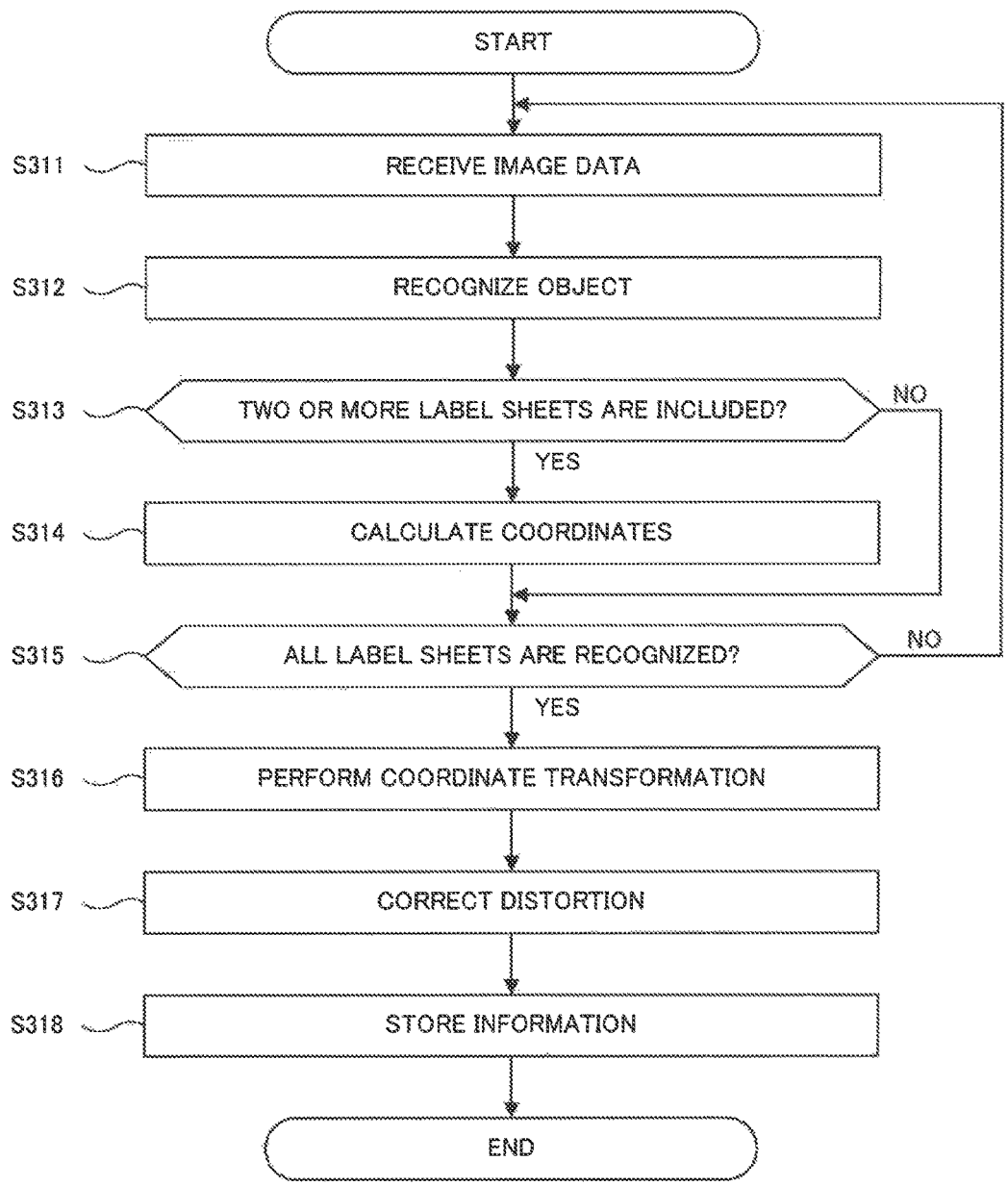
FIG. 13 is a flowchart illustrating another example of registration processing.

FIG. 13 is a flowchart illustrating registration processing performed by the display device 320. In Step S311, the communication unit 323 receives image data generated by the imaging device 310. In Step S312, the image processing unit 324 recognizes an object from the image data received in Step S311. In the present example embodiment, the image processing unit 324 recognizes a label sheet.

In Step S313, the control unit 321 determines whether or not two or more label sheets are included in one captured image. When two or more label sheets are included in one captured image (YES in S313), the control unit 321 specifies a relative positional relationship between the label sheets in Step S314. Specifically, the control unit 321 calculates, with reference to a position of any of the label sheets included in the captured image, coordinates of the other label sheet.

On the other hand, when two or more label sheets are not included in one captured image (NO in S313), the control unit 321 skips the processing in Step S314. In other words, in this case, the control unit 321 does not perform calculation of coordinates. That is to say, image data indicating a captured image that does not include two or more label sheets are excluded from a target to be processed in Step S314.

Figures 14, 15:
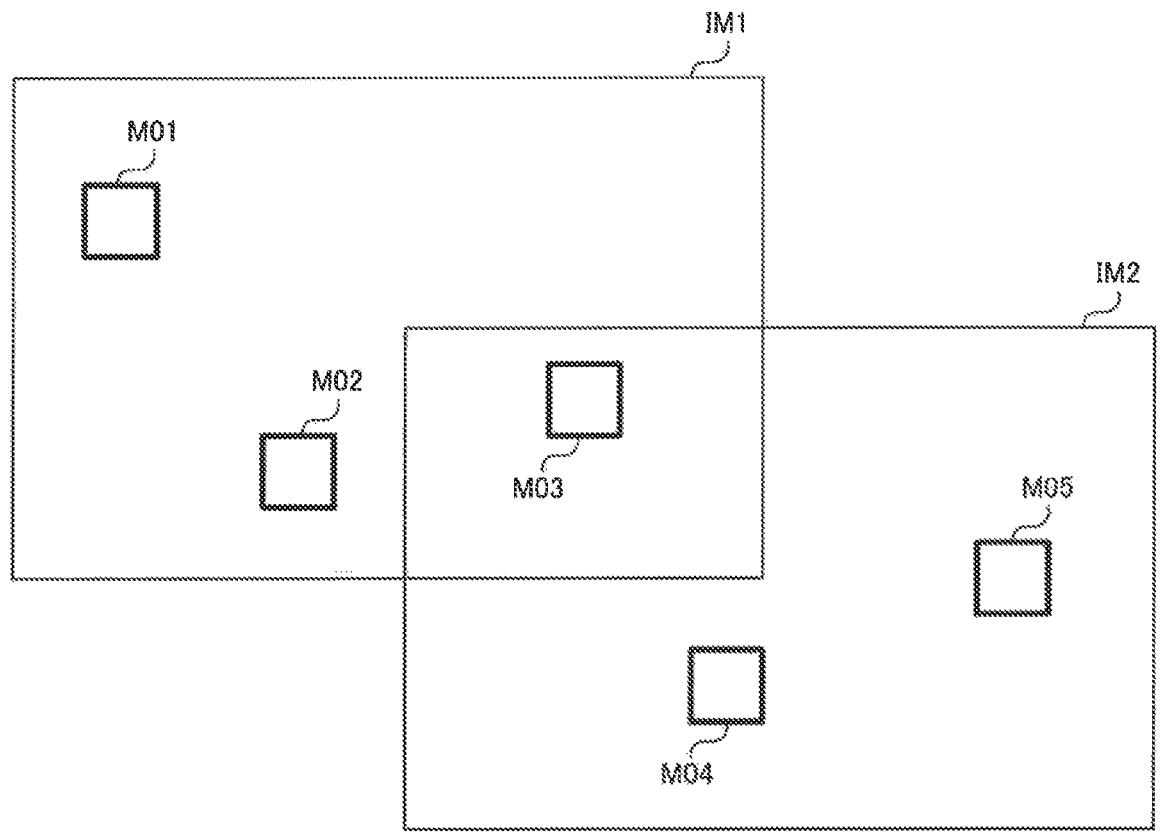
FIG. 14 is a diagram illustrating one example of a method of calculating coordinates.
FIG. 15 is a diagram illustrating one example of coordinate information.

FIG. 14 is a diagram exemplifying a method of calculating coordinates in Step S314. In this example, both of captured images IM1 and IM2 include a plurality of markers (namely, label sheets). Specifically, the captured image IM1 includes markers M01, M02, and M03. Further, the captured image IM2 includes markers M03, M04, and M05.

In this case, the control unit 321 detects relative positional relationships between the markers M01 and M02, between the markers M01 and M03, and between the markers M02 and M03 from the captured image IM1. Further, the control unit 321 detects relative positional relationships between the markers M03 and M04, between the markers M03 and M05, and between the markers M04 and M05 from the captured image IM2.

FIG. 15 is a diagram exemplifying coordinate information calculated by the control unit 321. In this example, the coordinate information is described by using an orthogonal coordinate system in which it is assumed that a horizontal direction (lateral direction) of a whiteboard is an x axis, a vertical direction (longitudinal direction) is a y axis, and a depth direction is a z axis. For the sake of description, it is assumed in this example that the markers do not incline to the depth direction and are not distorted. Therefore, in this example, all z components in the coordinate information are "0".

In a table of FIG. 15, coordinates of the markers M02 and M03 with a position of the marker M01 as an origin are described in a first row. The coordinates of the marker M02 with the position of the marker M01 as the origin are (x, y, z)=(12, −25, 0). Note that, the coordinates are merely an example, and do not necessarily coincide with arrangement of the markers described in FIG. 14. Similarly, coordinates of the marker M03 with a position of the marker M02 as an origin are described in a second row. Coordinates of the markers M04 and M05 with a position of the marker M03 as an origin are described in a third row. Coordinates of the marker M05 with a position of the marker M04 as an origin are described in a fourth row.

Note that, the control unit 321 may not calculate coordinates of a pair of markers that are not included in one captured image. For this example, the control unit 321 may omit calculation of coordinates of, for example, a pair of the markers M01 and M04 and a pair of the markers M01 and M05.

When the same pair is included in a plurality of captured images, the control unit 321 may calculate coordinate information on the basis of each of the captured images and determine coordinate information by averaging the pieces of calculated coordinate information. In this case, the control unit 321 may regard coordinate information related to a so-called outlier as noise, exclude such coordinate information, and then calculate an average value. For example, the control unit 321 may calculate an average value ($\mu$) and a standard deviation ($\sigma$) of a plurality of pieces of coordinate information related to the same label sheet, exclude coordinate information that is not included in a predetermined range (for example, a range of $\mu \pm 2\sigma$) from the average value as noise, and then calculate an average value again.

In Step S315, the control unit 321 determines whether or not all label sheets are recognized. In some aspects, a total number of label sheets is predetermined. Alternatively, a specific label sheet (for example, the label sheet 31 or 32) may be predetermined as a label sheet to be read at last. In this case, the control unit 321 may determine that all label sheets are recognized when this specific label sheet is recognized. Furthermore, a user may perform a predetermined operation at a point of time when all label sheets are recognized. In this case, the control unit 321 may determine that all label sheets are recognized when the predetermined operation is received.

When all label sheets are not recognized (NO in S315), the display device 320 performs the processing in Steps S311 to S314 on each image data received from the imaging device 310 and performs the determination in S315 every time the processing is completed. The control unit 321 repeats the processing in Steps S311 to S315 until all label sheets are recognized.

When all label sheets are recognized (YES in S315), the control unit 321 performs processing in Step S316. Herein, the control unit 321 performs coordinate transformation on the coordinates calculated in Step S314. The coordinates calculated in Step S314 may vary in a position as a reference from marker to marker. In other words, the coordinates calculated in Step S314 may each vary in an origin. The processing in Step S316 is processing of unifying a coordinate system defined by each captured image individually in such a manner.

For example, the control unit 321 transforms coordinate information in such a way that a position of a specific marker is an origin. Herein, assuming that the position of the marker M01 is the origin, the control unit 321 is able to be calculate coordinate information about the marker M04 with reference to the marker M01 on the basis of coordinate information about a pair of the markers M01 and M03 and conditional information about a pair of the markers M03 and M04. Specifically, the control unit 321 performs addition or subtraction on each component in coordinate information.

Note that, after the coordinate transformation, when a plurality of markers are associated with the same (or substantially the same) coordinates, that is, when a plurality of markers overlap each other at the same coordinates, the control unit 321 may perform predetermined processing. For example, the control unit 321 may count the number of times each of the plurality of markers is recognized and select coordinate information about a marker having a greater number of recognition times as correct coordinate information. The recognition times herein may be counted by excluding a captured image associated with coordinate information excluded as noise.

When coordinate transformation of all the markers is completed, the image processing unit 324 corrects distortion of an image in the information written region A2 in Step S317. The image processing unit 324 corrects distortion of the image in the information written region A2 by a correction amount according to an inclination of a marker specified by the distortion in the marker region A1. However, the processing in Step S317 is not essential processing. For example, the processing in Step S317 may be omitted when each marker is captured from substantially the front and distortion in a captured image is little.

In Step S318, the control unit 321 stores first information and second information in the memory 322. The first information in the present example embodiment is image data indicating the information written region A2 of each label sheet. The image data corresponds to one example of additional information. Further, the first information may include information indicating a color and a shape of a label sheet. The second information in the present example embodiment is coordinate information about each marker after coordinate transformation.

When a plurality of pieces of image data indicating the information written region A2 of the same label sheet are obtained, the control unit 321 may store only one of the pieces of image data as additional information. For example, the control unit 321 may store image data with the highest resolution or image data with the least distortion among the plurality of pieces of image data. In this way, image data suitable for extraction of additional information is able to be selectively stored.

The control unit 321 may associate image data indicating a captured whiteboard with the first information and the second information and store the image data in the memory 322. When the entire whiteboard is captured by a plurality of times of capturing, the control unit 321 may generate image data indicating the entire whiteboard by combining the captured images.

After the information is stored in such a manner, the display device 320 is able to display a content according to the information stored in Step S318 by executing a predetermined program. In the present example embodiment, the display device 320 is different from the information processing device 200 in the second example embodiment, and does not need capturing of a whiteboard when displaying a content. For example, the predetermined program herein may also be document preparation software or presentation software.

Figure 16:
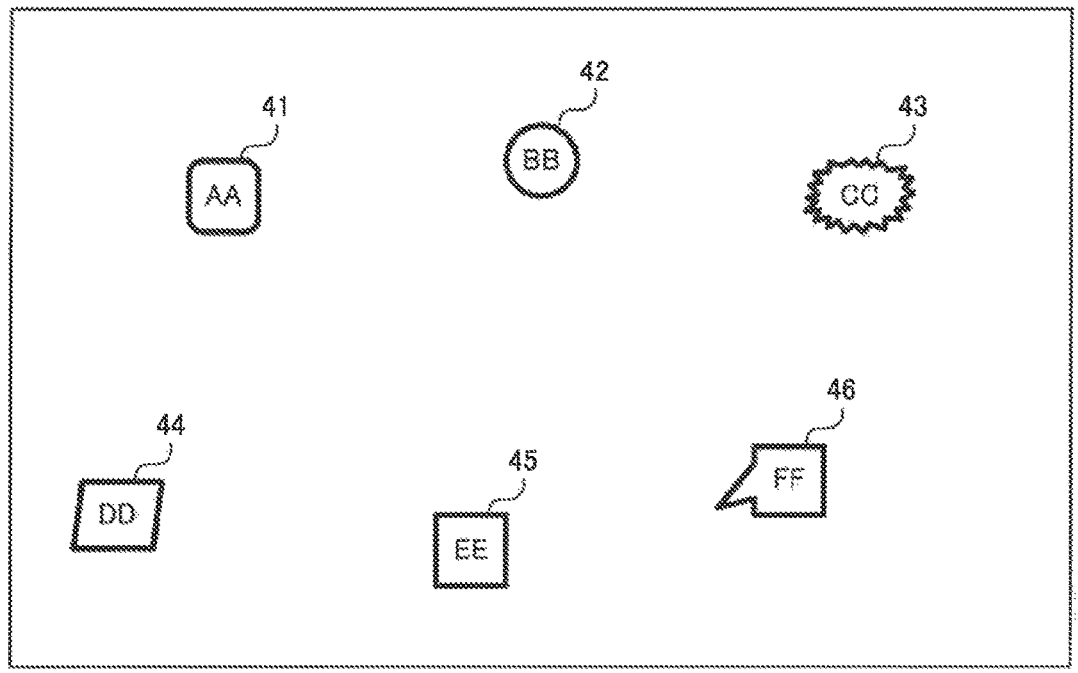
FIG. 16 is a diagram illustrating another example of display of a content.

FIG. 16 is a diagram illustrating one example of display of a content by the display device 320. The content illustrated in FIG. 16 is one example of a content corresponding to the label sheet exemplified in FIG. 12. Contents 41, 42, 43, 44, 45, and 46 are contents respectively associated with the label sheets 33, 34, 35, 36, 37, and 38 in FIG. 12. For example, the content 41 is associated with the label sheet 33.

The arrangement of the contents 41 to 46 is determined on the basis of coordinate information after coordinate transformation. Therefore, the contents 41 to 46 are displayed according to relative positional relationships among the label sheets 33 to 38. Note that, the label sheets 31 and 32 are label sheets attached for a position of a whiteboard to be recognized, and thereby the label sheets 31 and 32 may not be displayed as contents.

When a content is displayed, the control unit 321 may determine a color and a shape on the basis of the first information. For example, the control unit 321 may set shapes of contents varying with colors of label sheets. Alternatively, the control unit 321 may set colors of contents varying with shapes of label sheets.

The control unit 321 may cause the display unit 325 to display an image indicating a character or the like written on a whiteboard together with a content. For example, the control unit 321 may cause a content to be superimposed on an image indicating a character or the like written on a whiteboard and displayed. In this way, a user is able to view not only a content according to a label sheet attached to a whiteboard, but also a character or the like written on the whiteboard. Further, in this case, the control unit 321 may store coordinate information and additional information about a label sheet while associating the coordinate information and the additional information with image data indicating an image of the whiteboard.

As described above, the information processing system 300 according to the present example embodiment has the configuration that recognizes a plurality of objects (label sheets) and stores information according to a positional relationship between the plurality of recognized objects. With this configuration, the information processing system 300 is able to display a content according to a positional relationship between a plurality of recognized objects. For example, the information processing system 300 is able to display a content in such a way that a positional relationship between a plurality of objects is reproduced. A user can reproduce a content of a whiteboard without writing down the content on the whiteboard and reentering the content with document preparation software.

Modification Example

The present disclosure is not limited to the above-described example embodiments. The present disclosure may include an example embodiment to which modification or application that may be understood by a person skilled in the art is applied. For example, the present disclosure includes aspects following modification examples described below. Further, the present disclosure may include an aspect in which matters described in this description are appropriately combined as necessary. For example, a matter described with a specific example embodiment may also be applied to another example embodiment within a consistent range.

Modification Example 1

The control unit 210 in the second example embodiment may be configured to perform a part or the whole of processing performed by the image processing unit 240. Further, such modification is also applicable to the control unit 321 in the third example embodiment.

Figure 17:
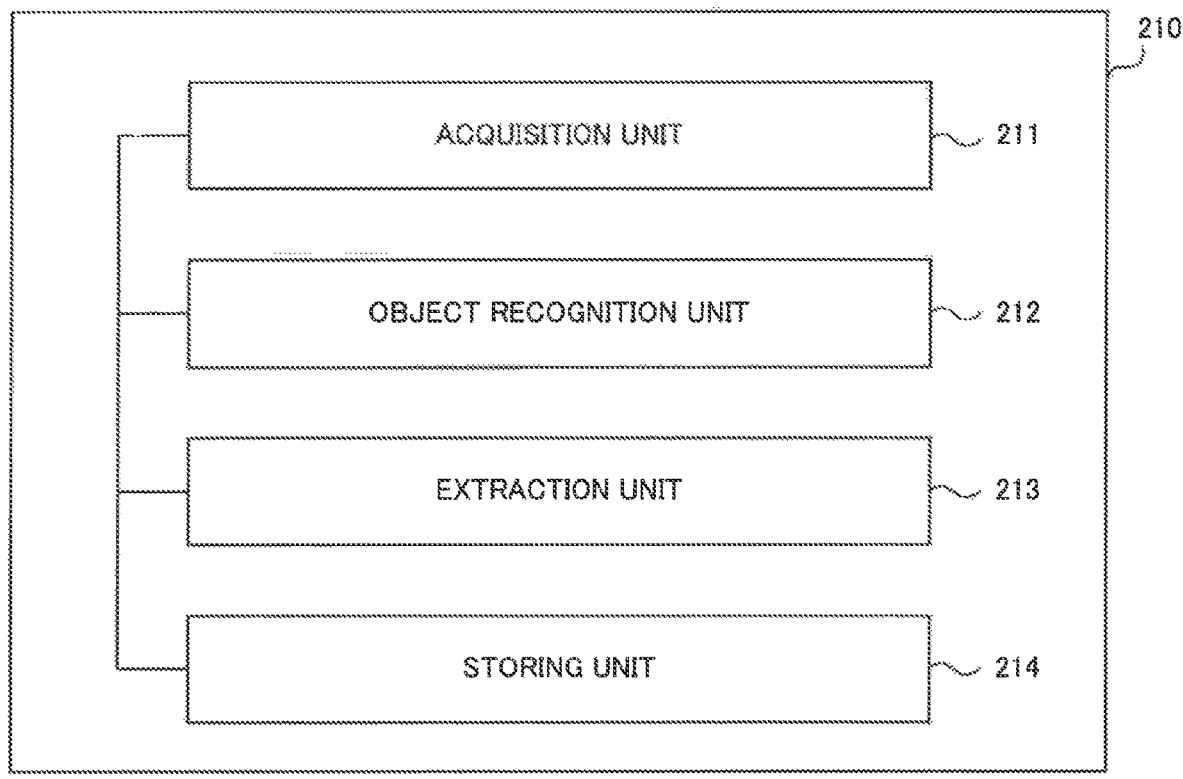
FIG. 17 is a block diagram illustrating still another example of a configuration of the information processing device.

FIG. 17 is a block diagram illustrating a modification example of the control unit 210. In this example, the control unit 210 includes an acquisition unit 211, an object recognition unit 212, an extraction unit 213, and a storing unit 214. The acquisition unit 211 acquires image data generated by an imaging unit 230 or data stored in a memory 220. The object recognition unit 212 and the extraction unit 213 respectively correspond to the object recognition unit 241 and the extraction unit 242 in the image processing unit 240.

The storing unit 214 stores information about an object recognized by the object recognition unit 212.

Modification Example 2

Predetermined processing may be assigned to a content displayed in the second example embodiment. When a user performs a predetermined operation on a displayed content, the information processing device 200 performs processing assigned to the content. The predetermined operation herein is, for example, an act of touching a content with a finger or pointing a content with a laser pointer. The information processing device 200 is able to detect such an operation on the basis of a captured image.

Figure 18:
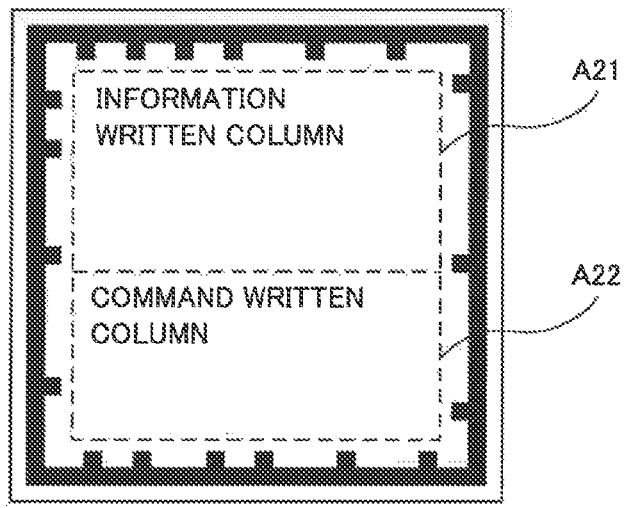
FIG. 18 is a diagram exemplifying a label sheet when predetermined processing is assigned to a content.

FIG. 18 is a diagram exemplifying a label sheet when predetermined processing is assigned to a content. This label sheet includes a first region A21 and a second region A22 instead of the information written region A2 exemplified in FIG. 11. Similarly to the information written region A2, a character or a figure related to a content is written in the first region A21. A character or a figure related to processing is written in the second region. A sticker related to each processing may be attached in the second region A22.

Associating processing to a character or a figure is performed in such a way that, for example, first processing is related to a character "A" and second processing is related to a character "B". The processing herein is, for example, processing of deleting a specific content or changing a display mode of a specific content. Alternatively, the processing herein may be processing of inputting specific data.

The extraction unit 242 extracts additional information from each of the first region A21 and the second region A22. For the sake of description, in the following description, additional information extracted from the first region A21 is referred to as "first additional information", and additional information extracted from the second region A22 is referred to as "second additional information".

The control unit 210 causes the display unit 250 to display a content according to the first additional information. When detecting a predetermined operation on any of contents after the contents are displayed, the control unit 210 performs processing according to the second additional information associated with the content. In this way, the content is able to function as an input interface.

Modification Example 3

The technique in the third example embodiment may be used as a technique for a control panel to be recognized in the second example embodiment. In other words, a user may attach a label sheet for recognizing a control panel in a specific position (for example, a corner) of the control panel. The label sheet for the control panel to be recognized corresponds to the label sheets 31 and 32 illustrated in FIG. 12.

The information processing device 200 may learn the control panel in advance by using such a label sheet. In other words, the information processing device 200 is able to recognize the control panel as a target to be recognized by capturing the control panel with the label sheet for recognizing the control panel being attached thereto.

Modification Example 4

The label sheet in the second example embodiment may include information other than a handwritten character. For example, a so-called pictogram or a predetermined figure (such as a two-dimensional code and a bar code) other than a marker may be formed on a surface of the label sheet. In this case, the extraction unit 242 may extract additional information from a figure such as a two-dimensional code.

Modification Example 5

An object being a target to be recognized is not limited to the object exemplified in each of the example embodiments. An object being a target to be recognized may have a certain feature that is distinguishable from another object. For example, the whiteboard in the third example embodiment may be replaced with a wall surface, a sheet of paper, a notebook, or the like. Further, the label sheet in the second example embodiment or the third example embodiment may be a sticker or a magnet.

Modification Example 6

A three-dimensional (3D) model may be used in recognition of an object. In other words, an object being a target to be recognized may have a 3D model previously generated.

Modification Example 7

Another sensor may be used to detect a position of an object being a target to be recognized. For example, a position (including a distance) of an object may be detected by a 3D camera (distance image sensor). Alternatively, a position of an object may be detected by a magnetic sensor.

Modification Example 8

A specific hardware configuration of each of the devices (the information processing devices 100 and 200, the imaging device 310, and the display device 320) according to the present disclosure has diverse variations, and is not limited to a specific configuration. For example, each of the devices may be achieved by using software or configured to share various processing by using a plurality of hardware.

Figure 19:
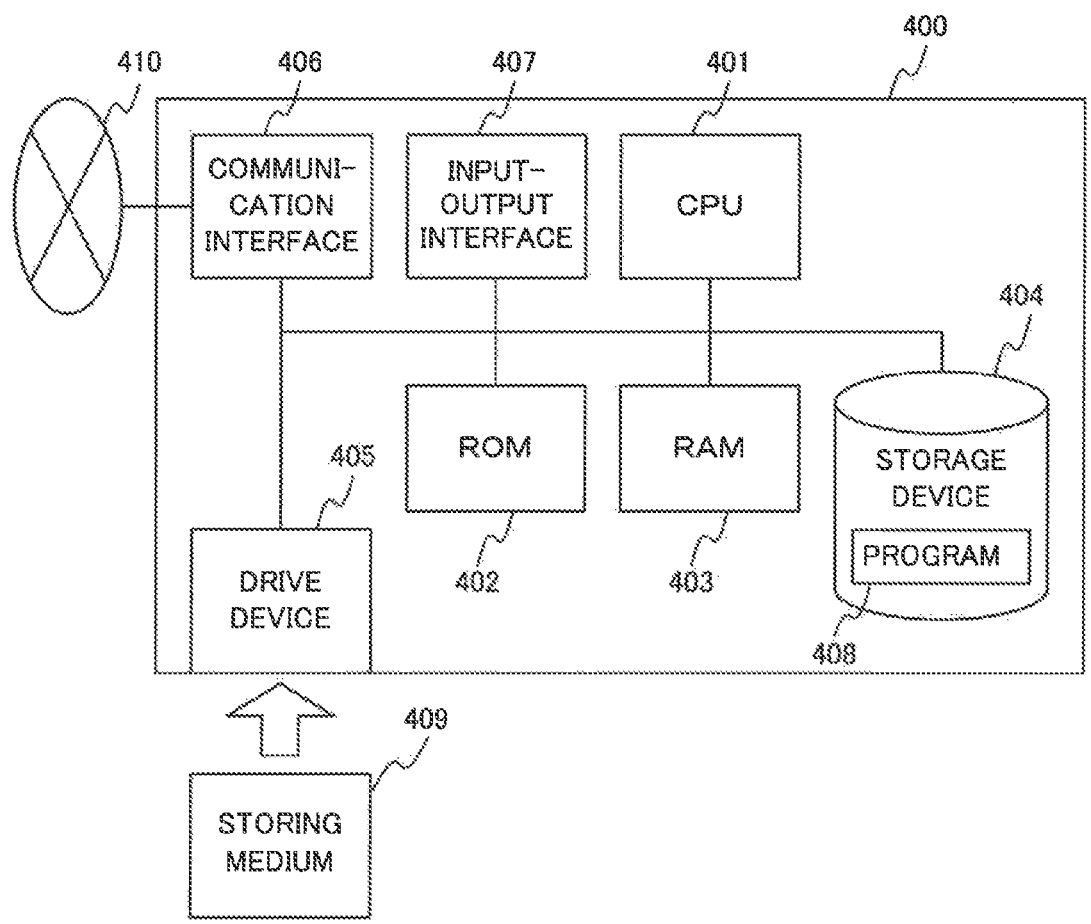
FIG. 19 is a block diagram illustrating one example of a hardware configuration of a computer device.

FIG. 19 is a block diagram illustrating one example of a hardware configuration of a computer device 400 that achieves each of the devices. The computer device 400 includes a CPU 401, a read only memory (ROM) 402, a random access memory (RAM) 403, a storing device 404, a drive device 405, a communication interface 406, and an input-output interface 407. Each of the devices according to the present disclosure may be achieved by the configuration (or a part thereof) illustrated in FIG. 19.

The CPU 401 executes a program 408 by using the RAM 403. The program 408 may be stored in the ROM 402. Further, the program 408 may be stored in a storing medium 409 such as a memory card and read by the drive device 405, or may be transmitted from an external device via a network 410. The communication interface 406 exchanges data with an external device via the network 410. The input-output interface 407 exchanges data with a peripheral device (such as an input device and a display device). The communication interface 406 and the input-output interface 407 may function as a means for acquiring or outputting data.

Note that, a component of each of the devices may be formed of a single circuit (such as a processor) or a combination of a plurality of circuits. The circuit (circuitry) herein may be either a dedicated or general-purpose circuit.

The configuration described as a single device in the above-described example embodiments may be distributed in a plurality of devices. For example, the information processing devices 100 and 200 may be achieved by a plurality of computer devices by using a cloud computing technology and the like.

While the present invention has been described above with reference to the example embodiments and the modification examples, the present invention is not limited to the example embodiments and the modification examples described above. Various modifications that can be understood by a person skilled in the art can be made to the configuration and details of the present invention within the scope of the present invention.

[Supplementary Notes]

A part or the whole of the exemplary embodiments can be described as the following supplementary notes, but not limited thereto.

(Supplementary Note 1)

An information processing device comprising:

an acquisition means for acquiring an image;

a recognition means for recognizing an object from an image acquired by the acquisition means; and a storing means for storing, when an object is recognized by the recognition means, first information associated with the object together with second information about a position of the object.

(Supplementary Note 2)

The information processing device according to supplementary note 1, wherein the storing means stores, when a plurality of objects are recognized by the recognition means, information according to a positional relationship between the plurality of objects as the second information.

(Supplementary Note 3)

The information processing device according to supplementary note 2, wherein the storing means stores, when a first object and a second object are recognized by the recognition means from a first image acquired by the acquisition means, the first information and the second information about a position of the second object while associating the first information and the second information with the first object.

(Supplementary Note 4)

The information processing device according to supplementary note 3, further comprising a display means, wherein the display means displays, when a second image is acquired by the acquisition means and the first object is recognized by the recognition means from the second image, a content according to the first information associated with the first object in a position according to the second information.

(Supplementary Note 5)

The information processing device according to supplementary note 4, wherein the display means displays the content together with the first object.

(Supplementary Note 6)

The information processing device according to supplementary note 5, wherein the display means displays the content in a predetermined position with respect to the first object.

(Supplementary Note 7)

The information processing device according to any one of supplementary notes 1 to 6, further comprising an extraction means for extracting additional information from an object recognized by the recognition means, wherein the storing means stores additional information extracted by the extraction means as the first information.

(Supplementary Note 8)

The information processing device according to supplementary note 7, wherein the additional information includes first additional information related to a content to be displayed and second additional information related to processing assigned to the content.

(Supplementary Note 9)

The information processing device according to any one of supplementary notes 1 to 8, wherein the acquisition means acquires a plurality of images, the recognition means recognizes a plurality of objects from each of the plurality of images, and the storing means calculates coordinate information indicating a positional relationship between the plurality of objects for each of the plurality of images and stores coordinate information transformed by coordinate transformation that unifies a coordinate system of the coordinate information, as the second information.

(Supplementary Note 10)

The information processing device according to supplementary note 9, wherein the recognition means recognizes an identical object from the plurality of images, and the storing means sets an average value of pieces of coordinate information about an identical object recognized from the plurality of images as coordinate information about the object.

(Supplementary Note 11)

The information processing device according to supplementary note 10, wherein the storing means excludes coordinate information that is not included in a predetermined range from the average value and calculates an average value again.

(Supplementary Note 12)

The information processing device according to supplementary note 9, wherein the storing means selects, when two different objects are associated with identical coordinates, any of the objects based on a number of times each of the objects is recognized by the recognition means.

(Supplementary Note 13)

An information processing method comprising:

acquiring an image;

recognizing an object from an image acquired; and storing, when an object is recognized, first information associated with the object together with second information about a position of the object.

(Supplementary Note 14)

A computer-readable program storing medium on which a program is stored, the program causing a computer to execute:

acquiring an image;

recognizing an object from an image acquired; and storing, when an object is recognized, first information associated with the object together with second information about a position of the object.

This application is based upon and claims the benefit of priority from Japanese patent application No. 2016-081007, filed on Apr. 4, 2016, the disclosure of which is incorporated herein in its entirety by reference.

REFERENCE SIGNS LIST

100, 200 Information processing device
110 Acquisition unit

120 Recognition unit
130 Storing unit
210 Control unit
220 Memory
230 Imaging unit
240 Image processing unit
241 Object recognition unit
242 Extraction unit
250 Display unit
300 Information processing system
310 Imaging device
311 Imaging unit
312 Communication unit
320 Display device
321 Control unit
322 Memory
323 Communication unit
324 Image processing unit
325 Display unit
400 Computer device

What is claimed is:

1. The information processing device comprising:
at least one memory storing instructions; and
the at least one processor is further configured to execute the instructions to:
acquire a plurality of images;
recognize a plurality of objects from each of the plurality of images;
select any of the objects based on a number of times each of the objects is recognized when two different objects are associated with identical coordinates;
calculate coordinate information indicating a positional relationship between the plurality of objects for each of the plurality of images; and
store coordinate information transformed by coordinate transformation that unifies a coordinate system of the coordinate information.

2. An information processing method comprising:
acquiring an image;
recognizing a plurality of objects from the plurality of images;
selecting any of the objects based on a number of times each of the objects is recognized when two different objects are associated with identical coordinates;
calculating coordinate information indicating a positional relationship between the plurality of objects for each of the plurality of images; and
storing coordinate information transformed by coordinate transformation that unifies a coordinate system of the coordinate information.

3. A non-transitory program storage medium storing a computer program that causes a computer to execute the processes of:
acquiring an image;
recognizing a plurality of objects from the plurality of images;
selecting any of the objects based on a number of times each of the objects is recognized when two different objects are associated with identical coordinates;
calculating coordinate information indicating a positional relationship between the plurality of objects for each of the plurality of images; and
storing coordinate information transformed by coordinate transformation that unifies a coordinate system of the coordinate information.

* * * * *